United States Patent
Song et al.

(10) Patent No.: US 12,516,595 B2
(45) Date of Patent: Jan. 6, 2026

(54) GEOSTEERING INTERPRETATION WITH MULTIPLE LOGGING-WHILE-DRILLING SENSORS

(71) Applicant: Halliburton Energy Services, Inc., Houston, TX (US)

(72) Inventors: Siyang Song, Houston, TX (US); Tingting Zeng, Houston, TX (US); Eirik Hansen, Stavanger (NO); Robert P. Darbe, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 474 days.

(21) Appl. No.: 18/170,920

(22) Filed: Feb. 17, 2023

(65) Prior Publication Data
US 2024/0280011 A1 Aug. 22, 2024

(51) Int. Cl.
*E21B 44/00* (2006.01)
*E21B 7/04* (2006.01)
(Continued)

(52) U.S. Cl.
CPC ............ *E21B 44/00* (2013.01); *E21B 7/04* (2013.01); *E21B 47/02* (2013.01); *E21B 47/026* (2013.01)

(58) Field of Classification Search
None
See application file for complete search history.

(56) References Cited

U.S. PATENT DOCUMENTS

| | | | | |
|---|---|---|---|---|
| 4,541,275 A | * | 9/1985 | Kerzner | E21B 47/026 702/7 |
| 6,012,017 A | * | 1/2000 | Van Bemmel | G01V 11/00 702/14 |

(Continued)

FOREIGN PATENT DOCUMENTS

| | | | |
|---|---|---|---|
| WO | WO-9727502 A1 * | 7/1997 | G01V 1/44 |
| WO | 2016209265 | 12/2016 | |

OTHER PUBLICATIONS

Mardia, et al., "Kriging and Splines with Derivative Information", Biometrika (1996), 83,1, pp. 207-221 Printed in Great Britain, 1996, 15 pages.

(Continued)

*Primary Examiner* — Lina Cordero
(74) *Attorney, Agent, or Firm* — DeLizio, Peacock, Lewin & Guerra LLP

(57) ABSTRACT

A computer-implemented method for drilling a wellbore in a subsurface formation. The method comprises obtaining measurement data including a first measurement from a first sensor and a second measurement from a second sensor of a drilling assembly in the wellbore. The method comprises generating, based on the first measurement, a first control point indicating a geological feature and having a first confidence interval. The method comprises generating, based on the second measurement, a second control point indicating the geological feature and having a second confidence interval. The method comprises generating a curve indicating a formation bed boundary of the subsurface formation based on the first and second control points and the first and second confidence intervals. The method comprises performing a drilling operation in the wellbore based on the formation bed boundary.

20 Claims, 10 Drawing Sheets

(51) Int. Cl.
 *E21B 47/02* (2006.01)
 *E21B 47/026* (2006.01)

(56) References Cited

U.S. PATENT DOCUMENTS

| | | | |
|---|---|---|---|
| 6,374,185 B1 * | 4/2002 | Taner | G01V 1/40 |
| | | | 702/14 |
| 7,359,844 B2 | 4/2008 | Sung et al. | |
| 9,273,517 B2 | 3/2016 | Tchakarov et al. | |
| 11,118,441 B2 | 9/2021 | Ma et al. | |
| 2006/0125479 A1 * | 6/2006 | Chemali | E21B 47/022 |
| | | | 324/339 |
| 2014/0316706 A1 * | 10/2014 | Grant | G01V 1/362 |
| | | | 702/11 |
| 2015/0088424 A1 * | 3/2015 | Burlakov | G01V 1/40 |
| | | | 702/6 |
| 2016/0341834 A1 | 11/2016 | Bartetzko et al. | |
| 2018/0225778 A1 * | 8/2018 | Grant | G06Q 50/02 |
| 2019/0078435 A1 | 3/2019 | Song et al. | |
| 2021/0102457 A1 * | 4/2021 | Dupont | E21B 47/04 |
| 2021/0326721 A1 | 10/2021 | Zhang et al. | |
| 2023/0021210 A1 | 1/2023 | Servais et al. | |
| 2023/0400598 A1 * | 12/2023 | Edwards | G06N 20/00 |

OTHER PUBLICATIONS

"PCT Application No. PCT/US2023/077036, International Search Report and Written Opinion", Feb. 14, 2024, 10 pages.

\* cited by examiner

GEOSTEERING INTERPRETATION WITH MULTIPLE LOGGING-WHILE-DRILLING SENSORS

FIELD

The disclosure generally relates to directional drilling and, in particular, identifying formation bed boundaries while drilling a wellbore through a subsurface formation.

BACKGROUND

In real-time geosteering operations, bed boundaries and/or fluid boundaries may be interpreted from different logging-while-drilling (LWD) logs. Since different LWD sensors may be configured with different depths of investigation (DOI), geosteering engineers may have different confidences in interpretations made from the different LWD sensors. Therefore, it is challenging to generate a fusion of different interpretations based on their confidence. Today, geosteering engineers may fuse the different interpretations manually using their knowledge and experience to generate a combined interpretation of the bed boundaries. The quality of the fusion highly depends on the engineers understanding of geology and logs, and extra errors may be introduced to the interpretation due to the understanding bias. Their confidence in the fusion of the interpretations is also empirical.

BRIEF DESCRIPTION OF THE DRAWINGS

Implementations of the disclosure may be better understood by referencing the accompanying drawings.

DESCRIPTION

Figure 1:
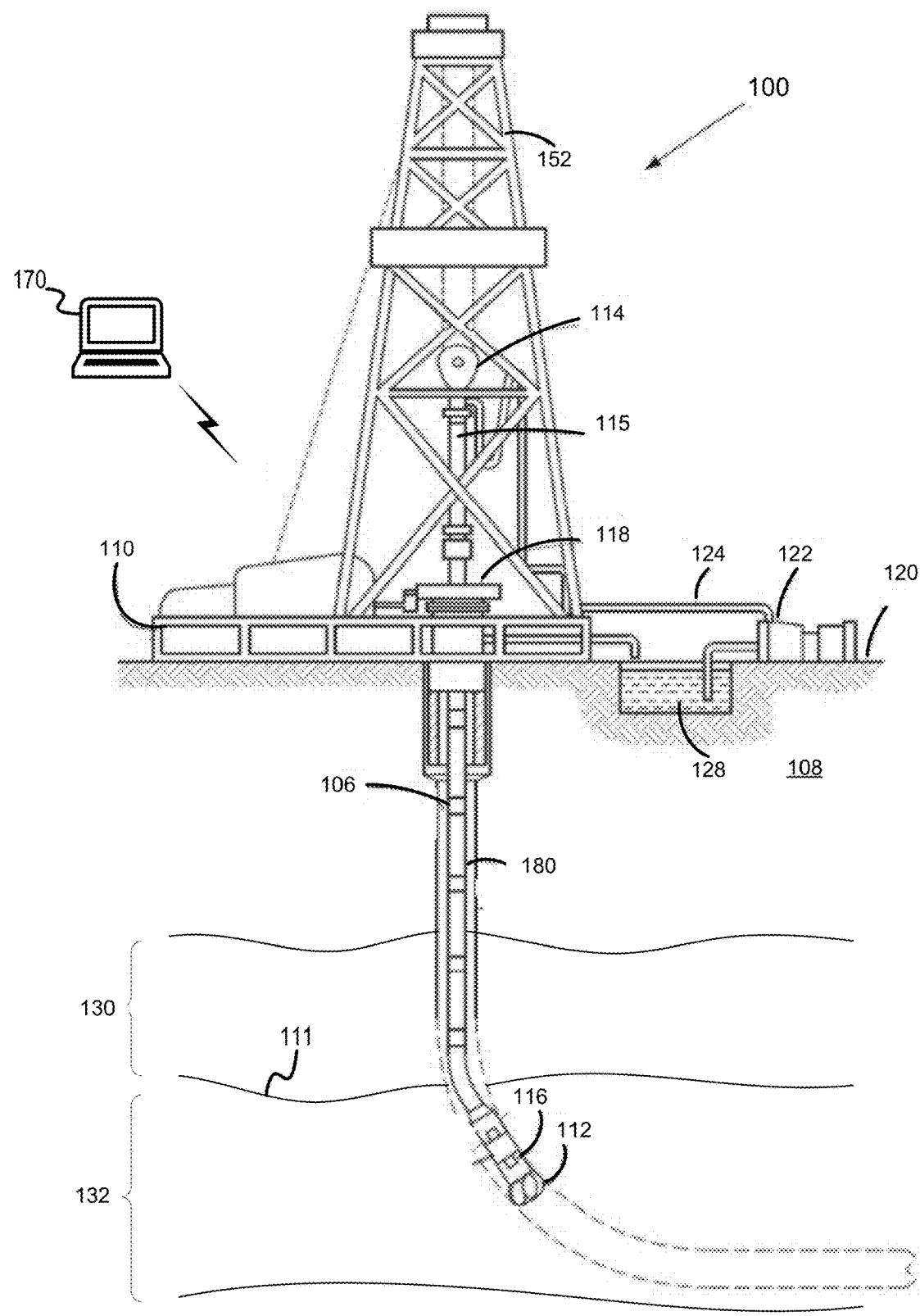
FIG. 1 depicts an example well system, according to some implementations.

The description that follows includes example systems, methods, techniques, and program flows that embody aspects of the disclosure. However, this disclosure may be practiced without these specific details. For instance, this disclosure refers to original kriging. Aspects of this disclosure may also be applied to any other fusion methods. For clarity, some well-known details and techniques may be omitted.

When drilling a wellbore, measurement logs from different sources may be obtained and interpreted to generate control points (i.e., a geological point of interest that may indicate a formation bed boundary). Control points may assist in geosteering the wellbore through the subsurface. For instance, a formation bed boundary depth in a geological model may be updated based on control points, and a drilling assembly may be steered to avoid contact with the updated formation bed boundary. Each measurement log obtained from its respective sensor may generate its own control points. For example, a log from a sensor may indicate a control point at a position (i.e., an easting and northing position, a measured depth (MD), etc.) and depth in the subsurface formation whereas other logs from different sensors may not indicate a control point at that same position. Additionally, the confidence interval associated with each control point may vary between control points depending on the sensors, the geology, etc. Thus, fusing the different control points, and their associated confidence intervals, from different measurement logs to accurately identify the formation bed boundary may be challenging. In addition to the estimated formation bed boundary, error in the variance of the formation bed boundary may result in significant ambiguity when making steering decisions. As further described below, example implementations may be used to help resolve these challenges.

Example implementations relate to estimating a formation bed boundary based on measurement data, where the formation bed boundary may then be utilized to make steering decisions when drilling a wellbore in the subsurface formations. Some implementations may obtain measurement data from sensors on a drilling assembly while drilling a wellbore in a subsurface formation. For example, a measurement log may be obtained from a sensor (e.g., a measure-while-drilling (MWD) sensor, logging-while-drilling (LWD) sensor, etc.,) and a different measurement log may be obtained from a different sensor. The measurement logs may include sensor measurements and the corresponding depths where the measurements were obtained. Some implementations may generate control points from each of the measurement logs. In some implementations, the control points may indicate a geological feature, such as a formation bed boundary. Additionally, in some implementations each of the control points may have a corresponding confidence interval. After the generation of the control points and corresponding confidence intervals, the control points and corresponding confidence intervals may be fused to generate a curve indicating a formation bed boundary of the subsurface formation. Additionally, some implementations may generate a confidence metric (i.e., variance) of the formation bed boundary. The confidence metric may be visualized to assist in reducing the risk in steering decisions while steering a drill bit through the subsurface formations. Some implementations may generate the formation bed boundary to have a minimal confidence metric, thus improving the consistency and accuracy of the formation bed boundary.

In some implementations, the formation bed boundary and confidence metric of the formation bed boundary may be used to perform a drilling operation for a current or future drilling operation. For example, a drilling operation may be initiated, modified, or stopped based on the formation bed boundary and confidence metric of the formation bed boundary. Examples of such wellbore operations may include adjusting a wellbore plan for a wellbore being drilled in the subsurface formation, making a steering decision to alter the trajectory of the wellbore, etc. For instance, the formation bed boundary and variance of the formation bed boundary may indicate the position of the wellbore relative to the formation bed boundary. Accordingly, in this example situation, a drilling parameter may be adjusted such that the wellbore avoids contacting the formation bed boundary.

Example System

FIG. 1 depicts an example well system, according to some implementations. In particular, FIG. 1 is a schematic diagram of a well system 100 that includes a drill string 180 having a drill bit 112 disposed in a wellbore 106 for drilling the wellbore 106 in the subsurface formation 108. While depicted for a land-based well system, example implementations may be used in subsea operations that employ floating or sea-based platforms and rigs.

The well system 100 may further include a drilling platform 110 that supports a derrick 152 having a traveling block 114 for raising and lowering the drill string 180. The drill string 180 may include, but is not limited to, drill pipe, drill collars, and drilling assembly 116. The drilling assembly 116 may comprise any of a number of different types of tools including a rotary steerable system (RSS), measurement while drilling (MWD) tools, logging while drilling (LWD) tools, mud motors, etc. A kelly 115 may support the drill string 180 as it may be lowered through a rotary table 118. The drill bit 112 may include roller cone bits, polycrystalline diamond compact (PDC) bits, natural diamond bits, any hole openers, reamers, coring bits, and the like. Drilling parameters of drilling the wellbore 106 may be adjusted to increase, decrease, and/or maintain the rate of penetration (ROP) of the drill bit 112 through the subsurface formation 108 and, additionally, steer the drill bit 112 through the subsurface formation 108. The subsurface formation 108 may include multiple formations such as formations 130, 132. The interface between the formations 130, 132 may be the formation bed boundary 111. The drilling parameters may assist in steering the wellbore 106 to avoid contact and/or penetration of the formation bed boundary 111. Drilling parameters may include weight-on-bit (WOB) and rotations-per-minute (RPM) of the drill string 180. A pump 122 may circulate drilling fluid through a feed pipe 124 to the kelly 115, downhole through interior of the drill string 180, through orifices in the drill bit 112, back to the surface 120 via an annulus surrounding the drill string 180, and into a retention pit 128.

In some implementations, various sections of the wellbore 106 such as the vertical, tangent, curve, and horizontal section may require directional drilling to steer the drill bit 112 on a planned well path and/or keep the wellbore 106 in a target formation. Sensors on the drilling assembly 116, such as gamma ray sensors, porosity sensors, resistivity sensors, etc., may log respective measurements while drilling the wellbore 106. The measurement logs may be obtained from the sensors on the drilling assembly 116 and uplinked to the surface 120. In some implementations, the measurements may be communicated to tools on the drilling assembly 116 for processing. The measurements may be processed and utilized to determine the location of the formation bed boundary 111. Steering decisions may be determined based on the wellbore 106 location relative to the formation bed boundary 111 and may be communicated back to the drilling assembly 116 for implementation to maintain the planned well path and/or remain in the target formation. For example, a target formation of the wellbore 106 may be formation 132. Steering decisions may be implemented such that the wellbore 106 may not be drilled through the formation bed boundary 111 and into formation 130.

Figure 9:
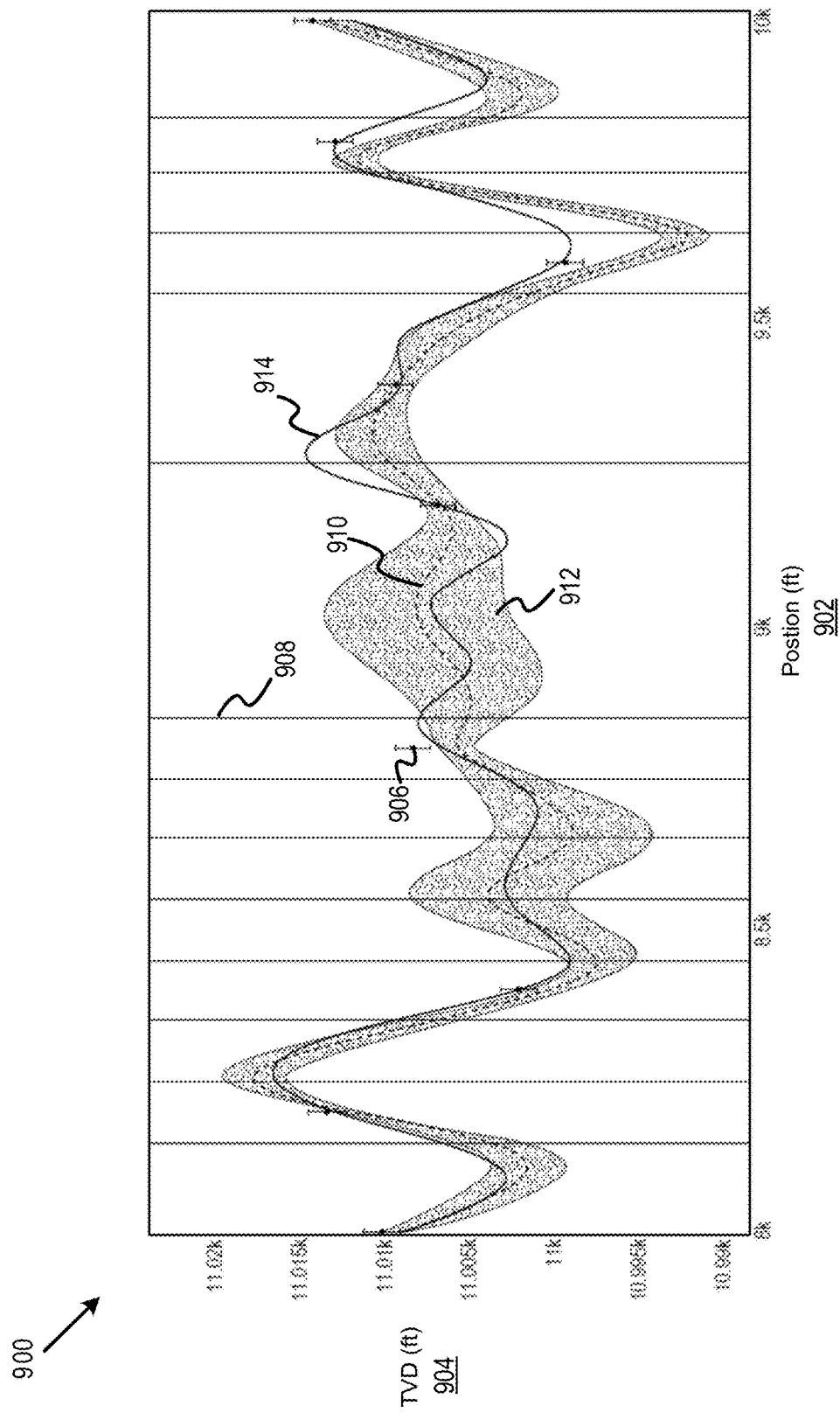
FIG. 9 depicts an example graph of interpolated formation bed boundaries with depth control points and dip control points, according to some implementations.

The well system 100 includes a computer 170 that may be communicatively coupled to other parts of the well system 100. The computer 170 may be local or remote to the drilling platform 110. A processor of the computer 170 may perform simulations (as further described below). In some implementations, the processor of the computer 170 may control drilling operations of the well system 100 or subsequent drilling operations of other wellbores. For instance, the processor of the computer 170 may determine the formation bed boundary 111 and determine steering inputs to avoid contacting the formation bed boundary 111. An example of the computer 170 is depicted in FIG. 9, which is further described below.

Example Operations

Example operations are now described.

Figure 2:
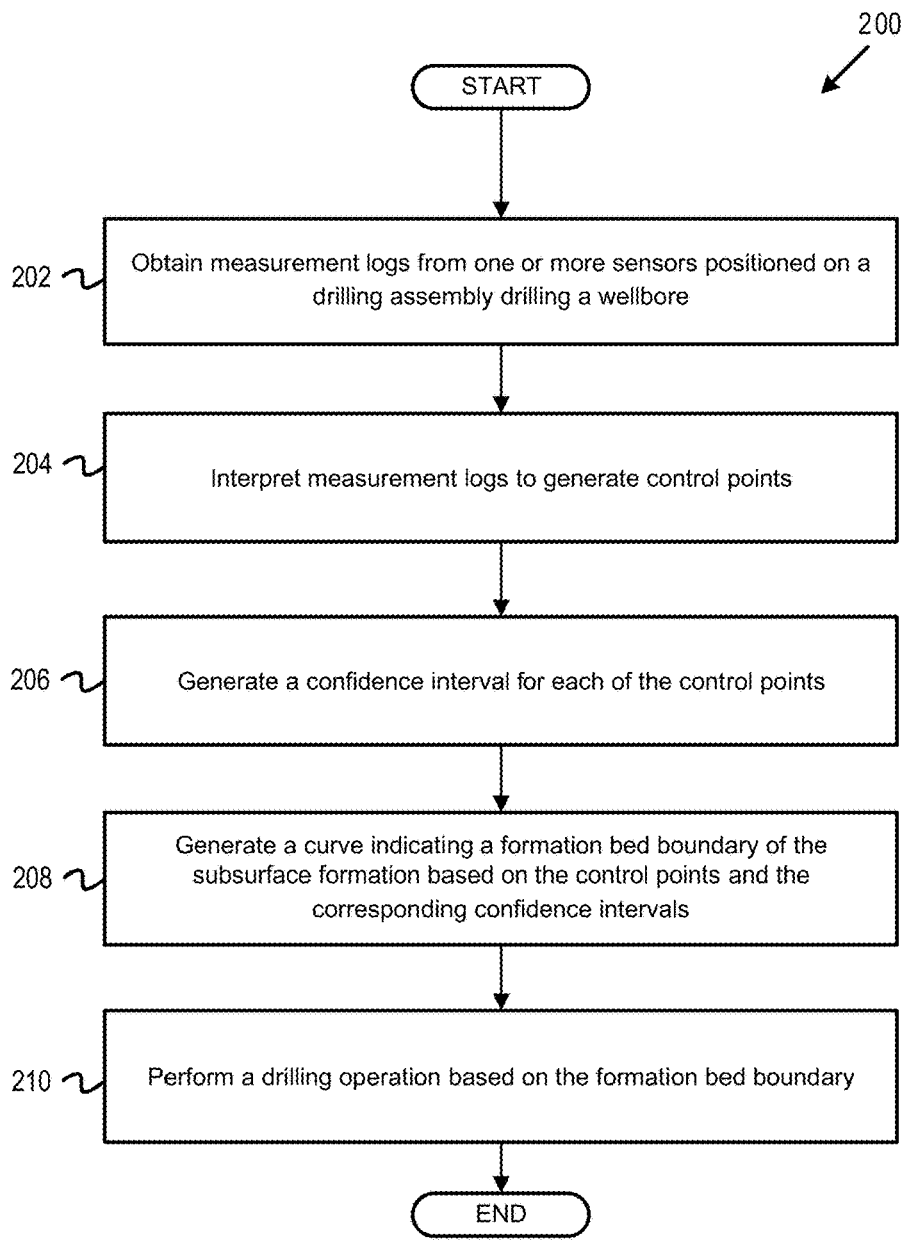
FIG. 2 depicts a flowchart of example operations for generating a formation bed boundary, according to some implementations.

FIG. 2 depicts a flowchart of example operations for generating a formation bed boundary, according to some implementations. FIG. 2 includes a flowchart 200 for generating a curve indicating a formation bed boundary. Operations of flowchart 200 of FIG. 2 are described in reference to the computer 170 of FIG. 1. Operations of the flowchart 200 start at block 202.

At block 202, the computer 170 may obtain measurement logs from one or more sensors positioned on a drilling assembly drilling a wellbore. The measurement logs may include a measurement of a formation property and the corresponding position (i.e., easting and northing position, measured depth (MD), etc.) and/or true vertical depth (TVD) in the subsurface formation where the measurement may have been taken by the sensor. In some implementations, the measurement logs may include a curve and an image. For example, a curve may indicate a measurement at a depth. An image may indicate a measurement in multiple azimuthal directions at a depth. The sensors may include a gamma ray (GR) sensor, a density sensor, a porosity sensor, a resistivity sensor, an acoustic sensor, a nuclear magnetic resonance (NMR) sensor, etc. Each of the sensors may be located on a drilling assembly, such as drilling assembly 116 of FIG. 1, while drilling a wellbore in a subsurface formation. In some implementations, more than one sensor may be positioned on the drilling assembly, thus one or more measurement logs may be obtained from the respective sensors. For example, a gamma ray log and a resistivity log may be obtained from a gamma ray sensor and a resistivity sensor, respectively, positioned on the drilling assembly. The sensors may have similar or different depths of investigation (DOI). For example, a gamma ray log may have a DOI of 12 inches into the formation, a resistivity log may have a DOI of 50 feet into the formation, and an ultra-deep electromagnetic (EM) measurement may have a DOI of 200 feet into the formation. In some implementations, the drilling assembly may include two of the same sensors, thus two measurement logs of a similar formation property may be obtained. For example, a drilling assembly may include two or more NMR sensors. One of the NMR sensors may have an DOI of 6 inches into the formation and the other NMR sensor may have a DOI of 36 inches into the formation.

At block 204, the computer 170 may interpret measurement logs to generate control points. A control point may indicate a geological point of interest in the subsurface formation. For example, a change in formation properties as indicated on one or more measurement logs may indicate a formation bed boundary at the corresponding depth. In some implementations, the geological point of interest on the measurement logs may be uncertain. For example, the measurement log may not clearly indicate a potential control point, or the measurement logs may be polluted by noise from the sensor. Each control point may include the sensor measurement and the corresponding position, TVD, and/or dip angle. In some implementations, the control point may only comprise a position and a dip angle (further discussed in FIG. 7). A control point may be generated from the interpretation of more than one measurement logs. For example, two or more measurements from the respective two or more measurement logs may indicate a geological point of interest at 15,000 ft MD. The measurements at 15,000 ft MD may be interpreted to generate a control point at 15,000 ft MD. Each of the measurement logs may include different control points. For example, a measurement log from a sensor may be interpreted to generate a control point located at 10,000 feet (ft) MD. A different measurement log from a different sensor may be interpreted to generate a control point at 10,100 ft MD, but not 10,000 ft MD as the other measurement log indicated.

The generation of the control points may be done manually and/or automatically. For instance, in some implementations, a geosteering expert may interpret the measurement logs to generate a control point. For example, the geosteering expert may identify an increase in the gamma ray on the gamma ray log and may interpret it as a formation bed boundary. In some implementations, the measurement logs may be utilized as inputs for automatic identification of geological points of interest in the measurement logs and subsequentially, the generation of one or more control points.

At block 206, the computer 170 may generate a confidence interval for each of the control points. In some implementations, the confidence interval for each of the control points may be manually generated. For instance, the confidence intervals may be empirically estimated by geosteering experts. In some implementations, the confidence intervals may be automatically generated. For instance, the confidence intervals may be generated via statistical estimation. The confidence interval may comprise the standard deviation of the control point (i.e., 1–σ, 2–σ, etc.), the variance of the control point, etc. In some implementations, the confidence interval may be represented as a range of values. For example, an upper and lower range may represent a 90% confidence interval in the control point. The confidence interval may depend on the geology of the subsurface formation. For example, a geosteering expert may be familiar with the formation properties, seismic data may be available to identify any faults in the formations, offset logs may be available, etc. Additionally, the confidence interval may depend on the DOI of each sensor.

Figure 3:
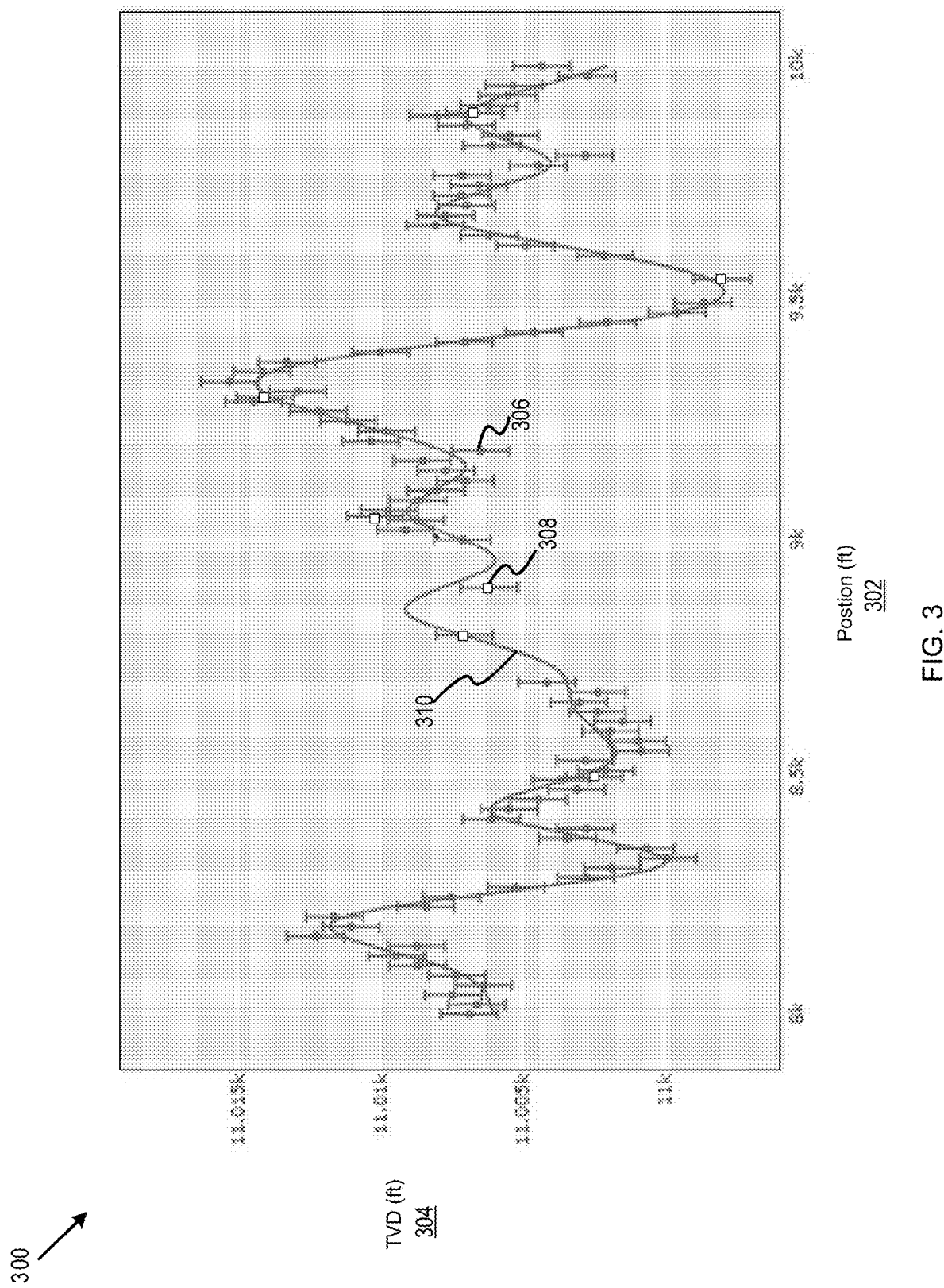
FIG. 3 depicts an example graph of control points generated from multiple sensors, according to some implementations.

To help illustrate, FIG. 3 depicts an example graph of control points generated from multiple sensors, according to some implementations. FIG. 3 depicts a graph 300 that includes an x-axis 302 and a y-axis 304. The x-axis 302 is the position in feet (ft). The y-axis 404 is the TVD in feet (ft). The graph 300 includes control points 306, 308. Control points 306 are generated from a measurement log obtained from a sensor on a drilling assembly. Control points 308 are generated from a different measurement log obtained from a sensor different from that of the sensor utilized to generate the control points 306. Each of the control points 306, 308 include an upper stem and lower stem indicating the confidence interval associated with each control point. The graph 300 depicts a 1–σ confidence interval. Other confidence intervals as described above may be illustrated on the graph 300. The graph 300 also includes the formation bed boundary curve 310. The formation bed boundary curve 310 may be the ground truth to help visualize the proximity and/or accuracy of each control point 306, 308.

At block 208, the computer 170 may generate a curve indicating a formation bed boundary of the subsurface formation based on the control points and the corresponding confidence intervals. The curve may be generated based on the fusing of the control points generated from multiple sensors (i.e., interpolation between the control points). The control points may be fused by methods including original kriging, simple kriging, etc. Generation of the curve is further described in FIG. 4.

At block 210, the computer 170 may perform a drilling operation based on the formation bed boundary.

Figure 4:
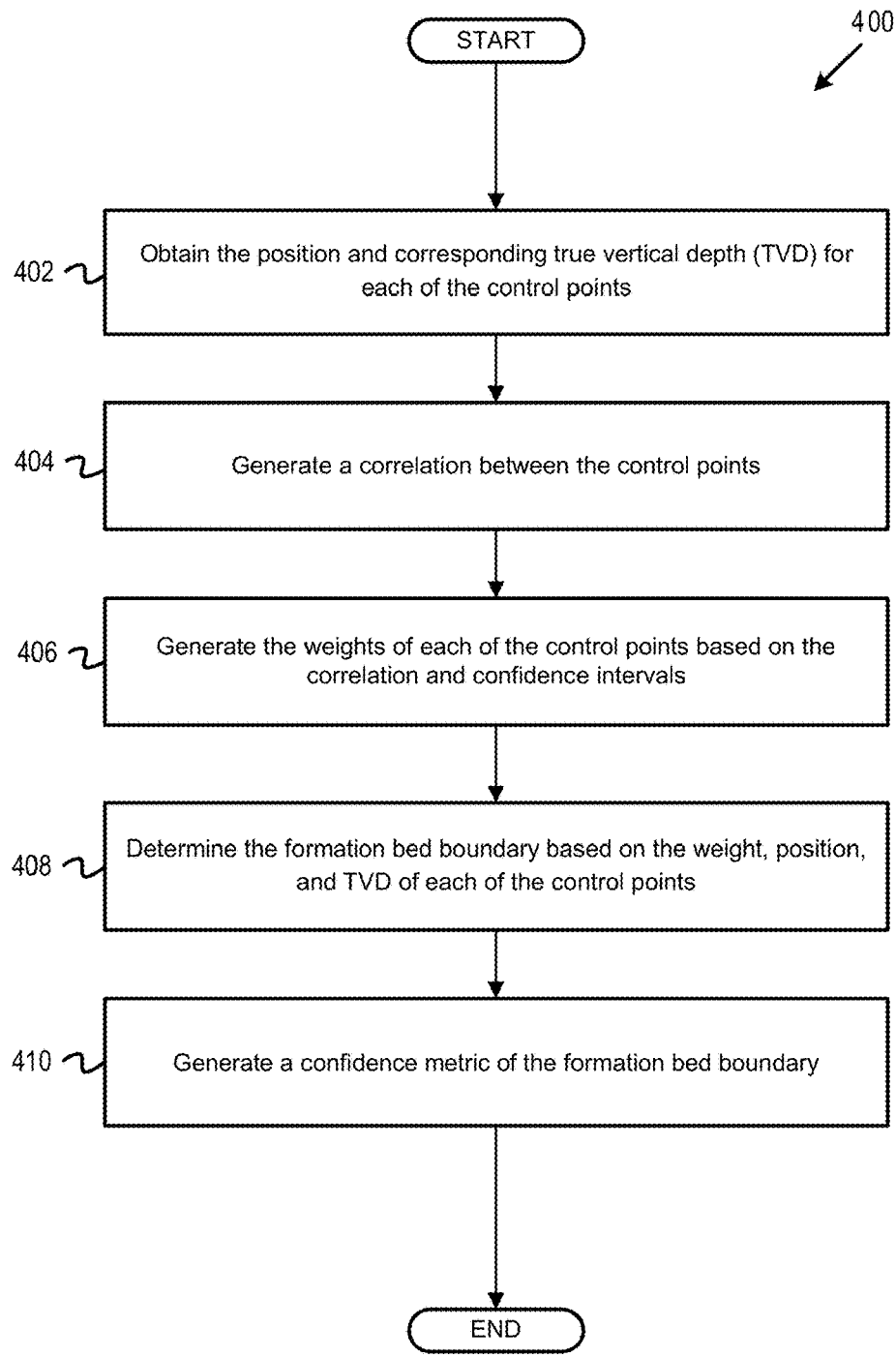
FIG. 4 depicts a flowchart of example operations for generating a formation bed boundary and a formation bed boundary confidence metric, according to some implementations.

FIG. 4 depicts a flowchart of example operations for generating a formation bed boundary and a formation bed boundary confidence metric, according to some implementations. FIG. 4 includes a flowchart 400 for generating a curve indicating a formation bed boundary using original kriging. The generation of the formation bed boundary and the formation bed boundary confidence metric described herein are not limited to original kriging, and other fusion methods may be utilized. Operations of flowchart 400 of FIG. 4 are described in reference to the computer 170 of FIG. 1. Operations of the flowchart 400 start at block 402.

At block 402, the computer 170 may obtain the position and corresponding true vertical depth (TVD) for each of the control points. The position may include the easting and northing position of the control point (e.g., the x-axis 302 of FIG. 4). The TVD may be generated from the interpretation of the measurement logs. For example, a geological point of interest identified on the measurement logs may be manually or automatically interpreted to be a control point. The result of the interpretation may include the TVD. In some implementations, the dip angle may also be obtained at the control point. Additionally, the confidence interval associated with each control point may be obtained by the computer 170.

Figure 5:
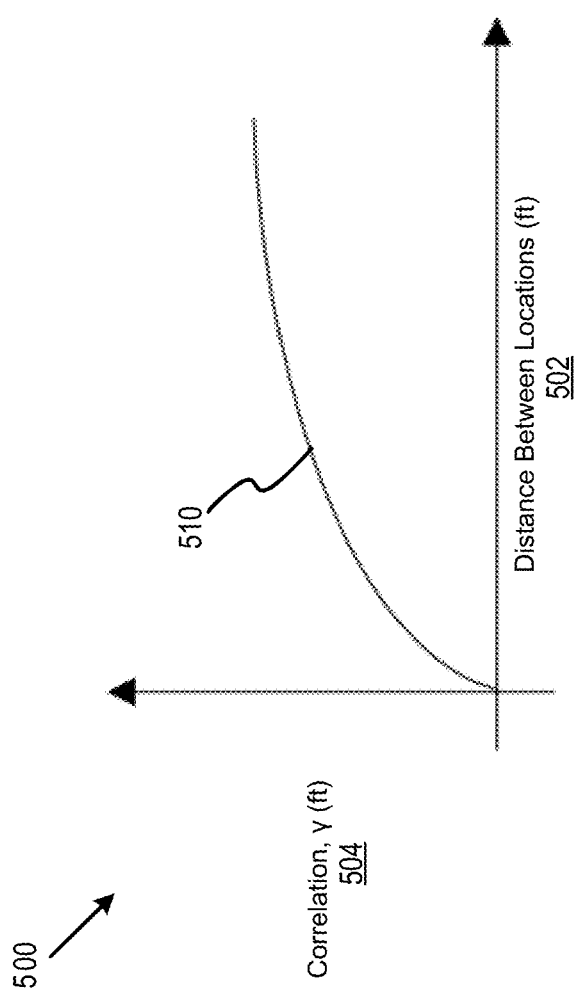
FIG. 5 depicts an example variogram, according to some implementations.

At block 404, the computer 170 may generate a correlation between the control points. A variogram may be utilized to describe the similarity of the geology in different locations, considering the spatial continuity of the geology. The geological correlation of two control points may be described with a variogram using Equation 1:

$$\gamma(x_1, x_2) = \text{Var}(Z(x_1) - Z(x_2)) \qquad (1)$$

Where $\gamma$ is the correlation (i.e., that variogram value), $x_1$ is the position of the first control point, $x_2$ is the position of the second control point, and Z is the TVD of control point. To help illustrate, FIG. 5 depicts an example variogram, according to some implementations. FIG. 5 depicts a variogram 500 that includes an x-axis 502 and a y-axis 504. The x-axis 502 is the distance between two locations in feet (ft). The y-axis 504 is the correlation, $\gamma$, in feet (ft). The curve 510 of variogram 500 describes the variability of the TVD between two control points. For instance, the greater the distance between two control points, the more the TVD for each of the control points may vary. The variogram may be manually or automatically generated. In some implementations, the variogram may be fitted from a current interpretation of the formation bed boundary and/or determined by the experience of geologists. The variogram may be generated with variogram models including an exponential model, a cubic model, a gaussian model, etc. In some implementations, parameters of a variogram may be determined and/or adjusted to generate the variogram. For example, variogram parameters including the model type, the nugget, the range, and the sill of the variogram may be adjusted to generate the shape of the variogram curve 510. In some implementations, the correlation between the control points may be determined with a semivariogram.

At block 406, the computer 170 may generate the weights of each of the control points based on the correlation and confidence intervals. The weights for each of the control points may be determined using Equation 2:

$$\begin{bmatrix} W \\ \mu \end{bmatrix} = \begin{bmatrix} \gamma(x_1, x_1) + \sigma_1^2 & \cdots & \gamma(x_1, x_n) & 1 \\ \vdots & \ddots & \vdots & \vdots \\ \gamma(x_n, x_1) & \cdots & \gamma(x_n, x_n) + \sigma_n^2 & 1 \\ 1 & \cdots & 1 & 0 \end{bmatrix}^{-1} \begin{bmatrix} \gamma(x_1, x^*) \\ \vdots \\ \gamma(x_n, x^*) \\ 1 \end{bmatrix} \quad (2)$$

Where x* is the position of the formation bed boundary, $\sigma_n$ is the confidence interval for each control point, W is the weight vector describing the weight for each control point, and μ is the summation of the weights. In this implementation μ is equal to 1. Equation 2 depicts the confidence interval as the standard deviation. The confidence interval in Equation 2 is not limited to the standard deviation, and may be other values as described in block 206 of FIG. 2.

At block 408, the computer 170 may determine the formation bed boundary based on the weights, positions, and TVD of each of the control points. In some implementations, a linear weighted average of the control points utilized by ordinary kriging may determine an unbiased and optimal estimation of the formation bed boundary average due to the weights generated in block 406. The formation bed boundary may be generated using Equation 3:

$$\hat{Z}(x^*) = \sum_{i=1}^{n} w_i \cdot \hat{Z}(x_i) \quad (3)$$

Where $w_i$ is the weight of each control point, and $\hat{Z}(x_i)$ is the TVD of each control point. Using Equations 2 and 3, the TVD of the formation bed boundary may be interpolated at each position x*. The curve of the interpolated formation bed boundary at each position x* is described in FIG. 7 below.

At block 410, the computer 170 may generate a confidence metric of the formation bed boundary. In some embodiments, the confidence metric may include the variance of the formation bed boundary. The variance at each position x* may be generated using Equation 4:

$$\text{Var}(x^*) = \\ W^T \cdot \begin{bmatrix} \gamma(x_1, x_1) + \sigma_1^2 & \cdots & \gamma(x_1, x_n) \\ \vdots & \ddots & \vdots \\ \gamma(x_n, x_1) & \cdots & \gamma(x_n, x_n) + \delta_n^2 \end{bmatrix} \cdot W - 2 \cdot W^T \cdot \begin{bmatrix} \gamma(x_1, x^*) \\ \vdots \\ \gamma(x_n, x^*) \end{bmatrix} \quad (4)$$

In some implementations, the variance may represent the confidence of the formation bed boundary from the fusion of the control points.

Figure 6:
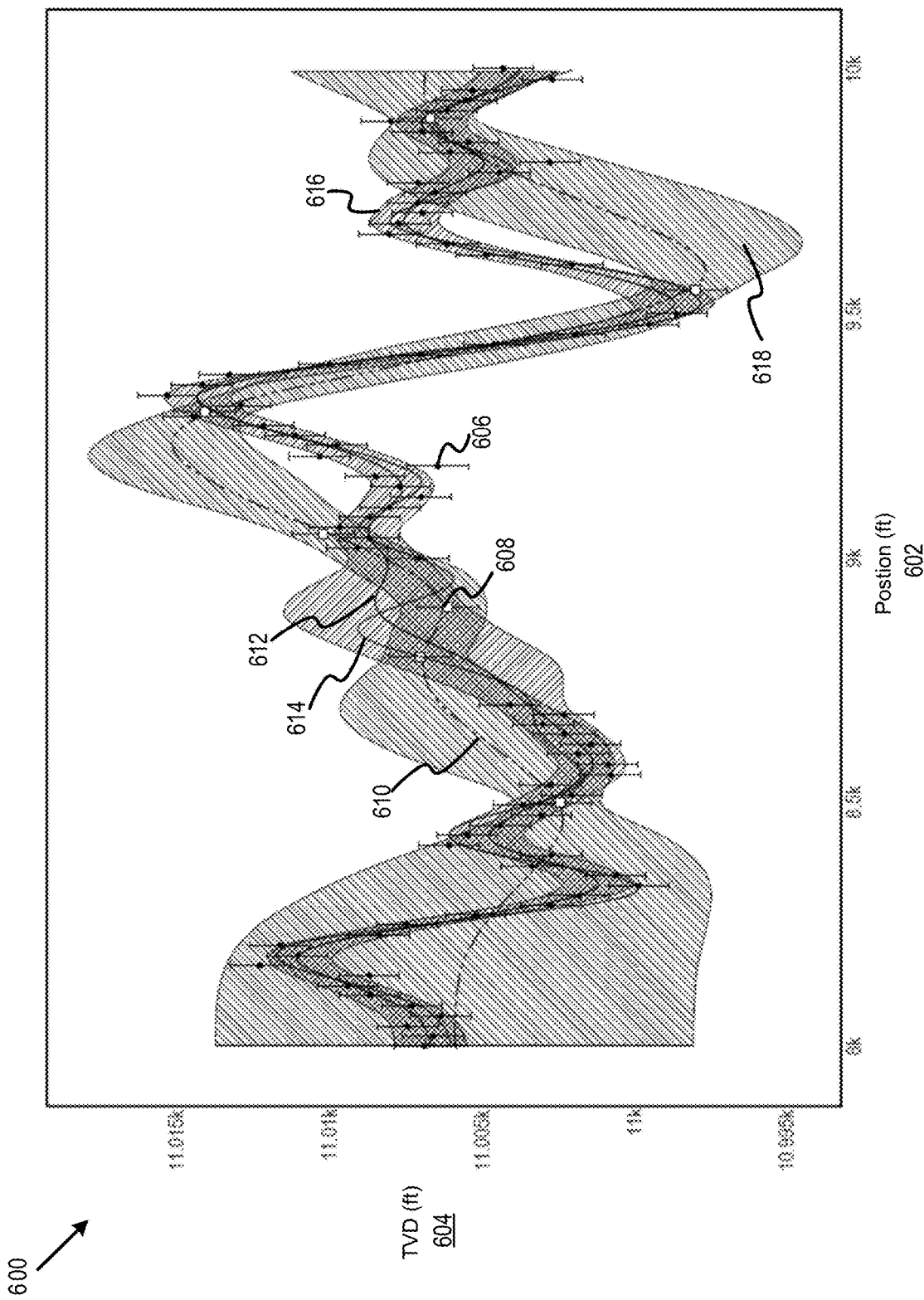
FIG. 6 depicts an example graph of independent interpolated formation bed boundaries, according to some implementations.

To help illustrate, FIG. 6 depicts an example graph of independent interpolated formation bed boundaries, according to some implementations. FIG. 6 depicts a graph 600 that includes an x-axis 602 and a y-axis 604. The x-axis 602 is the position in feet (ft). The y-axis 604 is the TVD in feet (ft). The graph 600 includes control points 606, 608, each subset being from different sensors. Each of the control points 606, 608 include the upper and lower bounds of the confidence intervals. The first interpolated formation bed boundary 614 is the formation bed boundary interpolated using only the control points 606. The first variance 616 is the variance of the first interpolated formation bed boundary 614. Likewise, the second interpolated formation bed boundary 610 is the formation bed boundary interpolated using only the control points 608. The second variance 618 is the variance of the first interpolated formation bed boundary 614. The actual formation bed boundary 612 may be utilized as the ground truth for visual comparison purposes.

Figure 7:
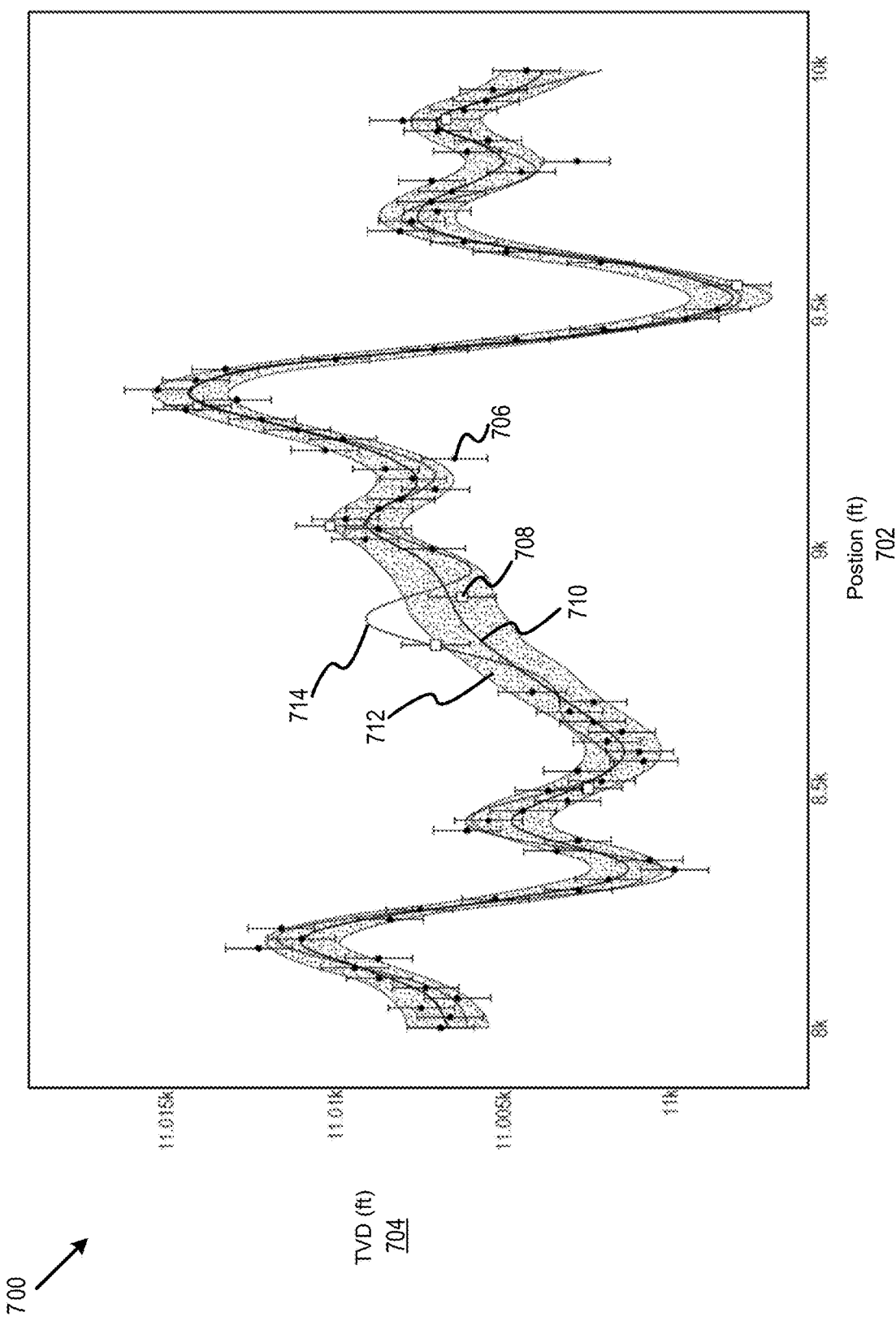
FIG. 7 depicts an example graph of an interpolated formation bed boundary with fusion of the control points, according to some implementations.

FIG. 7 depicts an example graph of an interpolated formation bed boundary with fusion of the control points, according to some implementations. FIG. 7 depicts a graph 700 that includes an x-axis 702 and a y-axis 704. The x-axis 702 is the position in feet (ft). The y-axis 704 is the TVD in feet (ft). The graph 700 includes control points 706, 708, each subset being from different sensors. Each of the control points 706, 708 include the upper and lower bounds of the confidence intervals. The graph 700 also includes the interpolated formation bed boundary 710 using the fusion of the control points (as described in blocks 402 through 408). The graph 700 includes the variance 712 of the interpolated formation bed boundary 710. As shown, the variance 712 is narrower than the first and second variances 616, 618 of the interpolated formation bed boundaries 610, 614, respectively, which may indicate a higher confidence in the interpolated formation bed boundary 710. Additionally, the proximity of the interpolated formation bed boundary 710 to the actual formation bed boundary 714 is closer than the proximity of interpolation bed boundaries 610, 614 to the actual formation bed boundary 612 of FIG. 6, indicating the fusion of the control points may generate a more accurate interpolated formation bed boundary.

Figure 8:
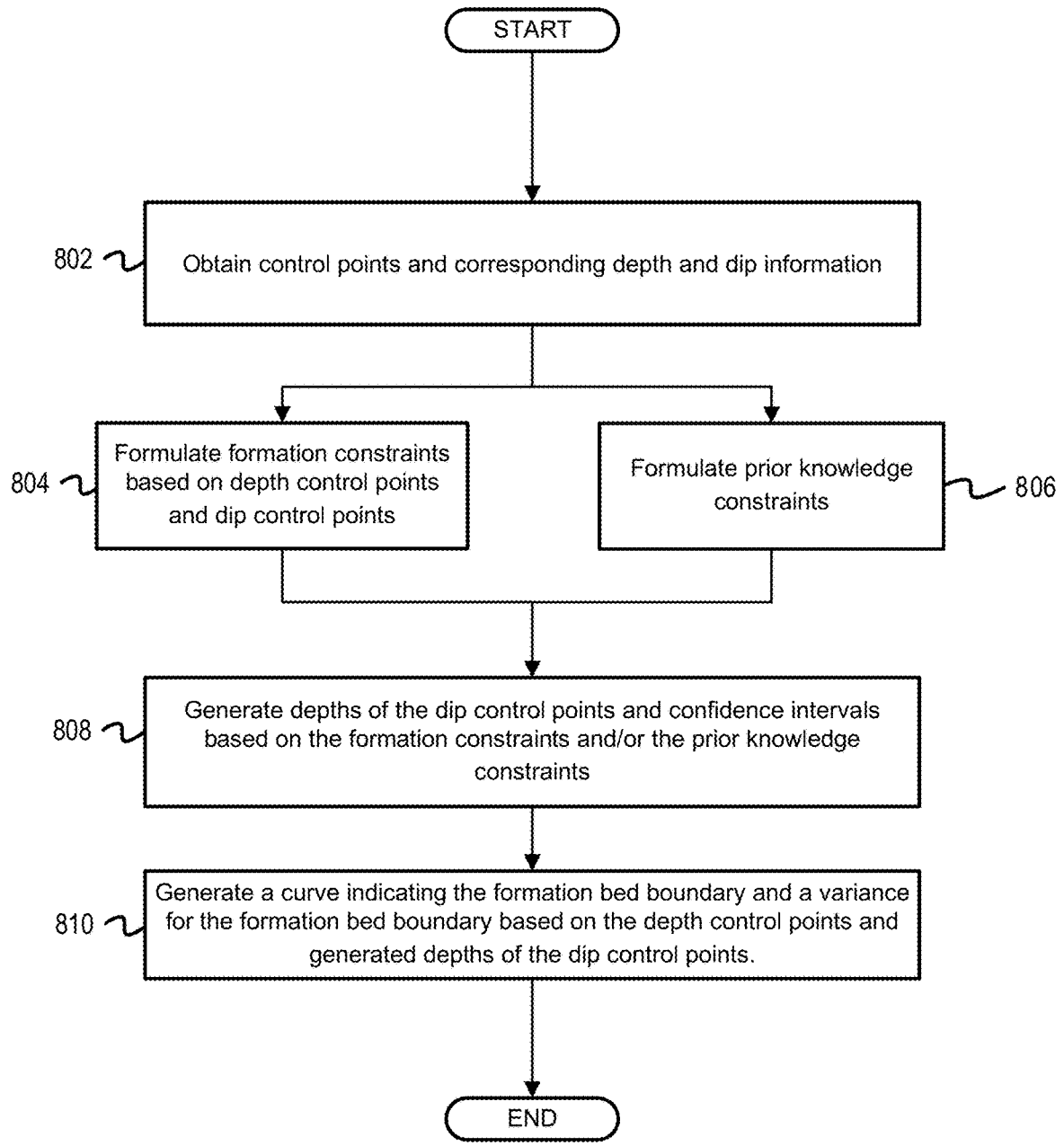
FIG. 8 depicts a flowchart of example operations for generating a true vertical depth (TVD) of a dip control point, according to some implementations.

FIG. 8 depicts a flowchart of example operations for generating a true vertical depth (TVD) of a dip control point, according to some implementations. In some implementations, control points may only include a dip angle. FIG. 8 includes a flowchart 800 for generating a TVD of a control point that may only include a dip angle. Operations of flowchart 800 of FIG. 8 are described in reference to the computer 170 of FIG. 1. Operations of the flowchart 800 start at block 802.

At block 802, the computer 170 may obtain control points with corresponding depth and dip information. A depth control point may only have TVD information available. A depth control point may be generated from multiple sources including gamma ray logs, density logs, porosity logs, etc. A dip control point may only have dip angle information available. A dip control point may be generated from sensors such as gamma image, density image, resistivity image, etc. In some implementations, a control point may have both TVD and dip angle information available. However, in some instances, the control points with both TVD and dip angle information may not be deterministic. The depth and dip control points may have a corresponding confidence interval. The confidence interval may be made manually, such as by geosteering experts, or automatically. The confidence intervals may be quantified by statistics, such as standard deviation of the interpretation, variance of the interpretation, quantile numbers of the interpretation, etc. Operations of flowchart 800 may proceed to both block 804 and block 806. Operations of block 804 and block 806 may be performed in parallel.

At block 804, the computer 170 may formulate formation constraints based on the depth control points and dip control points. In some implementations, the formation bed boundary must follow constraints formulated from the depth and dip angle information available at each control point. For example, the formation bed boundary at a position may be limited to a similar depth and/or dip angle as the depth and/or dip angle of control points at the same position. Additionally, the confidence interval of the formation bed boundary at a position may be similar to the confidence interval of the control points at that same position. The formation constraints may include stratigraphic depths of the control points, dip of the control points, locations of the control points, uncertainties/confidence of control points, etc. Thus, the TVD of a dip control point may be constrained by the corresponding dip angle and proximate depth control points, which may then ultimately constrain the depth and/or dip angle of the formation bed boundary when interpolated.

At block 806, the computer 170 may formulate prior knowledge constraints. Prior knowledge such as spatial continuity, known faults, dip trends, etc. of the formation may be utilized as constraints and/or a cost function when interpreting and/or optimizing the formation bed boundary. The prior knowledge may be obtained from sources including historical well data, seismic data, etc. For example, if the spatial continuity of the formation is available, the spatial continuity may be utilized as a cost of the optimization of the formation bed boundary. As an additional example, if existing faults are known in the formation, the faults may be utilized as a constraint when optimizing the formation bed boundary. Thus, the TVD of a dip control point may be constrained by the prior knowledge of the formation, which may then ultimately constrain the depth and/or dip angle of the formation bed boundary when interpolated.

At block 808, the computer 170 may generate depth of the dip control points and confidence intervals based on the formation constraints and/or the prior knowledge constraints. The TVD of the dip control points may be numerically solved or explicitly solved. The confidence intervals may be generated via statistics such as variance, standard deviation, quantiles, etc. The confidence intervals may be generated independently from the depth generation of the control point or generated as part of the depth of the control point.

At block 810, the computer 170 may generate a curve indicating the formation bed boundary and a variance for the formation bed boundary based on the depths control points and generated depths of the dip control points.

To help illustrate, FIG. 9 depicts an example graph of interpolated formation bed boundaries with depth control points and dip control points, according to some implementations. FIG. 9 depicts a graph 900 that includes an x-axis 902 and a y-axis 904. The x-axis 902 is the position in feet (ft). The y-axis 904 is the TVD in feet (ft). The graph 900 includes depth control points 906. The depth control points 906 comprise a control point with a TVD. The graph 900 also includes dip control points 908. The dip control points 908 are depicted as lines because they do not have TVD information available. The TVD of the dip control points 908 may be determined with constraints such as the formation constraints and prior knowledge constraints described in blocks 804 and 806 of FIG. 8, respectively. The graph 900 includes the interpolated formation bed boundary 910 using the fusion of the depth control points 906 and the newly generated TVD of the dip control points 908. The interpolated formation bed boundary 910 may be generated using methods such as original kriging as described in FIG. 2. The graph 900 includes the variance 912 of the interpolated formation bed boundary 910. The actual formation bed boundary 914 is depicted for visual comparison purposes.

Example Computer

Figure 10:
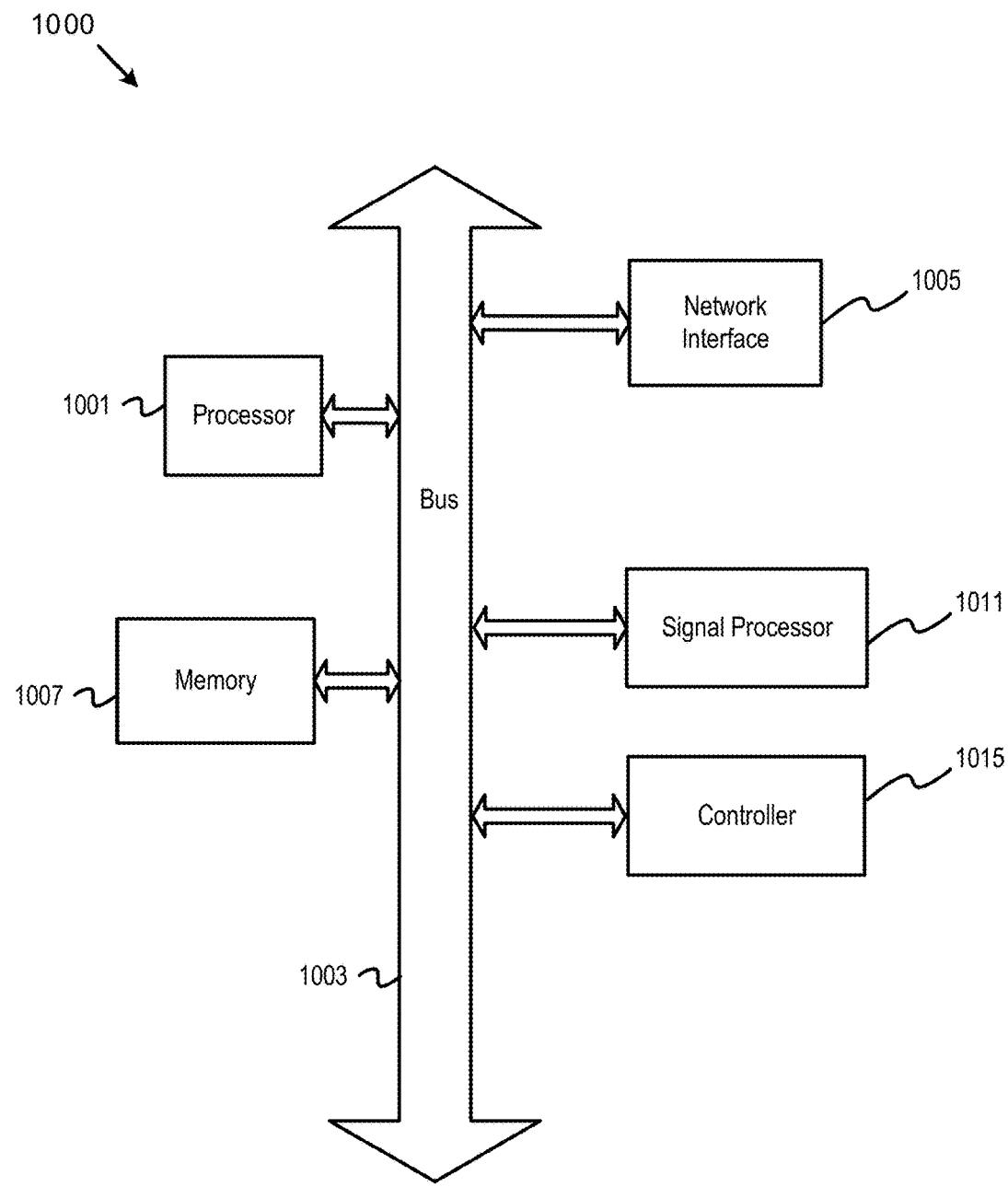
FIG. 10 depicts an example computer, according to some implementations.

FIG. 10 depicts an example computer, according to some implementations. FIG. 10 depicts a computer 1000 that includes a processor 1001 (possibly including multiple processors, multiple cores, multiple nodes, and/or implementing multi-threading, etc.). The computer 1000 includes a memory 1007. The memory 1007 may be system memory or any one or more of the above already described possible realizations of machine-readable media. The computer 1000 also includes a bus 1003 and a network interface 1005.

The computer 1000 also includes a signal processor 1011. The signal processor 1011 may perform one or more of the operations described herein. For example, the signal processor 1011 may process sensor measurements, such as measurements obtained from multiple sensors, and generate a curve indicating a formation bed boundary and a formation bed boundary variance. In response to the formation bed boundary and formation bed boundary variance, a controller 1015 may perform various operations to a drilling operation. For example, the controller 1015 may perform a drilling operation based on the depth of the formation bed boundary and corresponding variance of the formation bed boundary.

Any one of the previously described functionalities may be partially (or entirely) implemented in hardware and/or on the processor 1001. For example, the signal processor 1011 may include machine-readable instructions, some of which may reside in the memory 1007 and may be executed on the processor 1001. The functionality described may be implemented with an application specific integrated circuit, in logic implemented in the processor 1001, in a co-processor on a peripheral device or card, etc. Further, realizations may include fewer or additional components not illustrated in FIG. 10 (e.g., video cards, audio cards, additional network interfaces, peripheral devices, etc.). The processor 1001 and the network interface 1005 are coupled to the bus 1003. Although illustrated as being coupled to the bus 1003, the memory 1007 may be coupled to the processor 1001.

While the aspects of the disclosure are described with reference to various implementations and exploitations, it will be understood that these aspects are illustrative and that the scope of the claims is not limited to them. In general, techniques for fusing control points to generate a curve indicating a formation bed boundary as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Implementations

Implementation #1: A computer-implemented method for drilling a wellbore in subsurface formation comprising: obtaining measurement data including a first measurement from a first sensor and a second measurement from a second sensor of a drilling assembly in the wellbore; generating, based on the first measurement, a first control point indicating a geological feature and having a first confidence interval; generating, based on the second measurement, a second control point indicating the geological feature and having a second confidence interval; generating a curve indicating a formation bed boundary of the subsurface formation based on the first and second control points and the first and second confidence intervals; and performing a drilling operation in the wellbore based on the formation bed boundary.

Implementation #2: The method of Implementation #1, further comprising: obtaining a position and a depth for each of the first and second control points; generating a correlation between the first and second control points based on the position and the depth for each of the first and second control points; generating a weight for each of the first and second control points based on the correlation and the first confidence interval to the first control point and the second confidence interval to the second control point; and wherein the formation bed boundary is based on the position and depth for each of the first and second control points and the weight for each of the first and second control points.

Implementation #3: The method of Implementations #2, further comprising: generating a confidence metric of the formation bed boundary based on the correlation between the first and second control points, each of the first and second confidence intervals, and the weight for each of the first and second control points, wherein the confidence metric includes a variance.

Implementation #4: The method of Implementations #2 or #3, wherein the generation of the correlation between the first and second control points includes generation via a variogram.

Implementation #5: The method of any one or more of Implementations #1-4, further comprising: obtaining a dip control point; generating a depth for the dip control point based a formation constraint, and a prior knowledge constraint; and generating a confidence interval of the depth of the dip control point.

Implementation #6: The method of Implementation #5, wherein the first control point and the second control point are depth control points, further comprising: generating the formation constraint based on the dip control point and the depth control points, the formation constraint comprising a dip measurement for the dip control point and the depth for each of the depth control points; and generating the prior knowledge constraint, the prior knowledge constraint comprising a spatial continuity, one or more known faults, and one or more dip trends.

Implementation #7: The method of any one or more of Implementations #1-#6, wherein the first and second sensor types are two different sensor types selected from a gamma ray sensor, a porosity sensor, a resistivity sensor, a nuclear magnetic resonance sensor, a density sensor, and an acoustic sensor.

Implementation #8: A non-transitory computer-readable medium including computer-executable instructions comprising: instructions to drill a wellbore in a subsurface formation; instructions to obtain measurement data including a first measurement from a first sensor and a second measurement from a second sensor of a drilling assembly in the wellbore; instructions to generate, based on the first measurement, a first control point indicating a geological feature and having a first confidence interval; instructions to generate, based on the second measurement, a second control point indicating the geological feature and having a second confidence interval; instructions to generate a curve indicating a formation bed boundary of the subsurface formation based on the first and second control points and the first and second confidence intervals; and instructions to perform a drilling operation in the wellbore based on the formation bed boundary.

Implementation #9: The non-transitory computer-readable medium of Implementation #8, further comprising: instructions to obtain a position and a depth for each of the first and second control points; instructions to generate a correlation between the first and second control points based on the position and the depth for each of the first and second control points; instructions to generate a weight for each of the first and second control points based on the correlation and the first confidence interval to the first control point and the second confidence interval to the second control point; and wherein the formation bed boundary is based on the position and depth for each of the first and second control points and the weight for each of the first and second control points.

Implementation #10: The non-transitory computer-readable medium of Implementation #9, further comprising: instructions to generate a confidence metric of the formation bed boundary based on the correlation between the first and second control points, each of the first and second confidence intervals, and the weight for each of the first and second control points, wherein the confidence metric includes a variance.

Implementation #11: The non-transitory computer-readable medium of Implementations #9 or #10, wherein the generation of the correlation between the first and second control points includes generation via a variogram.

Implementation #12: The non-transitory computer-readable medium of any one or more of Implementations #8-#11, further comprising: instructions to obtain a dip control point; instructions to generate a depth for the dip control point based a formation constraint, and a prior knowledge constraint; and instructions to generate a confidence interval of the depth of the dip control point.

Implementation #13: The non-transitory computer-readable medium of Implementation #12, wherein the first control point and the second control point are depth control points, further comprising: instructions to generate the formation constraint based on the dip control point and the depth control points, the formation constraint comprising a dip measurement for the dip control point and the depth for each of the depth control points; and instructions to generate the prior knowledge constraint, the prior knowledge constraint comprising a spatial continuity, one or more known faults, and one or more dip trends.

Implementation #14: The non-transitory computer-readable medium of any one or more of Implementations #8-#13, wherein the first and second sensor types are two different sensor types selected from a gamma ray sensor, a porosity sensor, a resistivity sensor, a nuclear magnetic resonance sensor, a density sensor, and an acoustic sensor.

Implementation #15: A system comprising: a first sensor of a drilling assembly in a wellbore; a second sensor of the drilling assembly; a processor; and a computer-readable medium having instructions stored thereon that are executable by the processor, the instructions including, instructions to drill the wellbore in a subsurface formation; instructions to obtain measurement data including a first measurement from the first sensor and a second measurement from the second sensor; instructions to generate, based on the first measurement, a first control point indicating a geological feature and having a first confidence interval; instructions to generate, based on the second measurement, a second control point indicating the geological feature and having a second confidence interval; instructions to generate a curve indicating a formation bed boundary of the subsurface formation based on the first and second control points and the first and second confidence intervals; and instructions to perform a drilling operation in the wellbore based on the formation bed boundary.

Implementation #16: The system of Implementation #15, further comprising: instructions to obtain a position and a depth for each of the first and second control points; instructions to generate a correlation between the first and second control points based on the position and the depth for each of the first and second control points; instructions to generate a weight for each of the first and second control points based on the correlation and the first confidence interval to the first control point and the second confidence interval to the second control point; and wherein the formation bed boundary is based on the position and depth for each of the first and second control points and the weight for each of the first and second control points.

Implementation #17: The system of Implementation #16, further comprising: instructions to generate a confidence metric of the formation bed boundary based on the correlation between the first and second control points, each of the first and second confidence intervals, and the weight for each of the first and second control points, wherein the confidence metric includes a variance.

Implementation #18: The system of Implementations #16 or #17, wherein the generation of the correlation between the first and second control points includes generation via a variogram.

Implementation #19: The system of any one of more of Implementations #15-#18, further comprising: instructions to obtain a dip control point; instructions to generate a depth for the dip control point based a formation constraint, and a prior knowledge constraint; and instructions to generate a confidence interval of the depth of the dip control point.

Implementation #20: The system of Implementation #19, wherein the first control point and the second control point are depth control points, further comprising: instructions to generate the formation constraint based on the dip control point and the depth control points, the formation constraint comprising a dip measurement for the dip control point and the depth for each of the depth control points; and instructions to generate the prior knowledge constraint, the prior knowledge constraint comprising a spatial continuity, one or more known faults, and one or more dip trends.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" may be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. A computer-implemented method for drilling a wellbore in a subsurface formation comprising:
    obtaining measurement data including a first measurement from a first sensor and a second measurement from a second sensor of a drilling assembly in the wellbore;
    generating, based on the first measurement, a first control point indicating a geological feature and having a first confidence interval;
    generating, based on the second measurement, a second control point indicating the geological feature and having a second confidence interval;
    generating a curve indicating a formation bed boundary of the subsurface formation based on the first control point and the second control point and the first confidence interval and the second confidence interval; and
    performing a drilling operation in the wellbore based on the formation bed boundary.

2. The computer-implemented method of claim 1, further comprising:
    obtaining a position and a depth for each of the first control point and the second control point;
    generating a correlation between the first control point and the second control point based on the position and the depth for each of the first control point and the second control point;
    generating a weight for each of the first control point and the second control point based on the correlation and the first confidence interval to the first control point and the second confidence interval to the second control point; and
    wherein the formation bed boundary is based on the position and the depth for each of the first control point and the second control point and the weight for each of the first control point and the second control point.

3. The computer-implemented method of claim 2, further comprising:
    generating a confidence metric of the formation bed boundary based on the correlation between the first control point and the second control point, each of the first confidence interval and the second confidence interval, and the weight for each of the first control point and the second control point, wherein the confidence metric includes a variance.

4. The computer-implemented method of claim 2, wherein the generation of the correlation between the first control point and the second control point includes generation via a variogram.

5. The computer-implemented method of claim 1, further comprising:
   obtaining a dip control point;
   generating a depth for the dip control point based on a formation constraint, and a prior knowledge constraint; and
   generating a confidence interval of the depth for the dip control point.

6. The computer-implemented method of claim 5, wherein the first control point and the second control point are depth control points, further comprising:
   generating the formation constraint based on the dip control point and the depth control points, the formation constraint comprising a dip measurement for the dip control point and a depth for each of the depth control points; and
   generating the prior knowledge constraint, the prior knowledge constraint comprising a spatial continuity, one or more known faults, and one or more dip trends.

7. The computer-implemented method of claim 1, wherein the first sensor and the second sensor are two different sensor types selected from a gamma ray sensor, a porosity sensor, a resistivity sensor, a nuclear magnetic resonance sensor, a density sensor, and an acoustic sensor.

8. A non-transitory computer-readable medium including computer-executable instructions comprising:
   instructions to drill a wellbore in a subsurface formation;
   instructions to obtain measurement data including a first measurement from a first sensor and a second measurement from a second sensor of a drilling assembly in the wellbore;
   instructions to generate, based on the first measurement, a first control point indicating a geological feature and having a first confidence interval;
   instructions to generate, based on the second measurement, a second control point indicating the geological feature and having a second confidence interval;
   instructions to generate a curve indicating a formation bed boundary of the subsurface formation based on the first control point and the second control point and the first confidence interval and the second confidence interval; and
   instructions to perform a drilling operation in the wellbore based on the formation bed boundary.

9. The non-transitory computer-readable medium of claim 8, further comprising:
   instructions to obtain a position and a depth for each of the first control point and the second control point;
   instructions to generate a correlation between the first control point and the second control point based on the position and the depth for each of the first control point and the second control point;
   instructions to generate a weight for each of the first control point and the second control point based on the correlation and the first confidence interval to the first control point and the second confidence interval to the second control point; and
   wherein the formation bed boundary is based on the position and the depth for each of the first control point and the second control point and the weight for each of the first control point and the second control point.

10. The non-transitory computer-readable medium of claim 9, further comprising:
    instructions to generate a confidence metric of the formation bed boundary based on the correlation between the first control point and the second control point, each of the first confidence interval and the second confidence interval, and the weight for each of the first control point and the second control point,
    wherein the confidence metric includes a variance.

11. The non-transitory computer-readable medium of claim 9, wherein the generation of the correlation between the first control point and the second control point includes generation via a variogram.

12. The non-transitory computer-readable medium of claim 8, further comprising:
    instructions to obtain a dip control point;
    instructions to generate a depth for the dip control point based on a formation constraint, and a prior knowledge constraint; and
    instructions to generate a confidence interval for the depth of the dip control point.

13. The non-transitory computer-readable medium of claim 12,
    wherein the first control point and the second control point are depth control points, further comprising:
    instructions to generate the formation constraint based on the dip control point and the depth control points, the formation constraint comprising a dip measurement for the dip control point and a depth for each of the depth control points; and
    instructions to generate the prior knowledge constraint, the prior knowledge constraint comprising a spatial continuity, one or more known faults, and one or more dip trends.

14. The non-transitory computer-readable medium of claim 8, wherein the first sensor and the second sensor are two different sensor types selected from a gamma ray sensor, a porosity sensor, a resistivity sensor, a nuclear magnetic resonance sensor, a density sensor, and an acoustic sensor.

15. A system comprising:
    a first sensor of a drilling assembly in a wellbore;
    a second sensor of the drilling assembly;
    a processor; and
    a non-transitory computer-readable medium having instructions stored thereon that are executable by the processor, the instructions including,
    instructions to drill the wellbore in a subsurface formation;
    instructions to obtain measurement data including a first measurement from the first sensor and a second measurement from the second sensor;
    instructions to generate, based on the first measurement, a first control point indicating a geological feature and having a first confidence interval;
    instructions to generate, based on the second measurement, a second control point indicating the geological feature and having a second confidence interval;
    instructions to generate a curve indicating a formation bed boundary of the subsurface formation based on the first control point and the second control point and the first confidence interval and the second confidence interval; and
    instructions to perform a drilling operation in the wellbore based on the formation bed boundary.

16. The system of claim 15, further comprising:
    instructions to obtain a position and a depth for each of the first control point and the second control point;
    instructions to generate a correlation between the first control point and the second control point based on the position and the depth for each of the first control point and the second control point;

instructions to generate a weight for each of the first control point and the second control point based on the correlation and the first confidence interval to the first control point and the second confidence interval to the second control point; and wherein the formation bed boundary is based on the position and the depth for each of the first control point and the second control point and the weight for each of the first control point and the second control point.

17. The system of claim 16, further comprising:
instructions to generate a confidence metric of the formation bed boundary based on the correlation between the first control point and the second control point, each of the first confidence interval and the second confidence interval, and the weight for each of the first control point and the second control point, wherein the confidence metric includes a variance.

18. The system of claim 16, wherein the generation of the correlation between the first control point and the second control point includes generation via a variogram.

19. The system of claim 15, further comprising:
instructions to obtain a dip control point;
instructions to generate a depth for the dip control point based on a formation constraint, and a prior knowledge constraint; and
instructions to generate a confidence interval of the depth for the dip control point.

20. The system of claim 19, wherein the first control point and the second control point are depth control points, further comprising:
instructions to generate the formation constraint based on the dip control point and the depth control points, the formation constraint comprising a dip measurement for the dip control point and a depth for each of the depth control points; and
instructions to generate the prior knowledge constraint, the prior knowledge constraint comprising a spatial continuity, one or more known faults, and one or more dip trends.

* * * * *